United States Patent
Sawa et al.

(10) Patent No.: US 9,884,317 B2
(45) Date of Patent: *Feb. 6, 2018

(54) INORGANIC/POLYMERIC HYBRID CATALYTIC MATERIALS WITH HIGH ACTIVITY IN VARIOUS SOLVENTS

(75) Inventors: Haruo Sawa, Kochi (JP); Pierluigi Barbaro, Sesto Fiorentino (IT); Claudio Bianchini, Sesto Fiorentino (IT); Francesca Liguori, Sesto Fiorentino (IT); Masatoshi Sashika, Kochi (JP)

(73) Assignee: NIPPON KODOSHI CORPORATION, Kochi-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/378,207

(22) PCT Filed: Feb. 14, 2012

(86) PCT No.: PCT/JP2012/054333
§ 371 (c)(1),
(2), (4) Date: Aug. 12, 2014

(87) PCT Pub. No.: WO2013/121593
PCT Pub. Date: Aug. 22, 2013

(65) Prior Publication Data
US 2015/0005154 A1    Jan. 1, 2015

(51) Int. Cl.
| | |
|---|---|
| *B01J 31/16* | (2006.01) |
| *B01J 35/06* | (2006.01) |
| *C08F 8/42* | (2006.01) |
| *H01M 8/10* | (2016.01) |
| *B01D 67/00* | (2006.01) |
| *B01D 69/14* | (2006.01) |
| *B01J 31/38* | (2006.01) |
| *B01J 31/34* | (2006.01) |
| *B01J 23/44* | (2006.01) |
| *B01J 31/06* | (2006.01) |
| *B01J 23/40* | (2006.01) |
| *B01J 23/48* | (2006.01) |
| *B01J 23/70* | (2006.01) |
| *B01D 71/70* | (2006.01) |
| *B01D 71/38* | (2006.01) |
| *B01J 31/12* | (2006.01) |
| *B01J 21/06* | (2006.01) |
| *B01J 21/08* | (2006.01) |
| *B01J 23/30* | (2006.01) |
| *B01J 35/00* | (2006.01) |
| *B01D 71/02* | (2006.01) |

(52) U.S. Cl.
CPC .......... *B01J 31/38* (2013.01); *B01D 67/0079* (2013.01); *B01D 69/145* (2013.01); *B01D 69/148* (2013.01); *B01D 71/38* (2013.01); *B01D 71/70* (2013.01); *B01J 23/40* (2013.01); *B01J 23/44* (2013.01); *B01J 23/48* (2013.01); *B01J 23/70* (2013.01); *B01J 31/069* (2013.01); *B01J 31/127* (2013.01); *B01J 31/34* (2013.01); *B01J 35/006* (2013.01); *B01D 71/024* (2013.01); *B01J 21/066* (2013.01); *B01J 21/08* (2013.01); *B01J 23/30* (2013.01); *B01J 31/068* (2013.01); *B01J 35/0013* (2013.01); *B01J 2231/645* (2013.01); *B01J 2531/824* (2013.01)

(58) Field of Classification Search
None
See application file for complete search history.

(56) References Cited

U.S. PATENT DOCUMENTS

| | | | |
|---|---|---|---|
| 7,101,638 B2 | 9/2006 | Sawa | |
| 7,396,616 B2 | 7/2008 | Sawa | |
| 2004/0062970 A1* | 4/2004 | Nomura | C08G 77/28 528/30 |
| 2008/0004457 A1 | 1/2008 | Fritsch et al. | |
| 2008/0176739 A1 | 7/2008 | Uozumi et al. | |
| 2009/0093597 A1 | 4/2009 | Aymonier et al. | |
| 2013/0035225 A1 | 2/2013 | Barbaro et al. | |

(Continued)

FOREIGN PATENT DOCUMENTS

| | | |
|---|---|---|
| CN | 1916004 A | 2/2007 |
| JP | 4041422 | 1/2008 |
| JP | 2009-523180 | 6/2009 |

(Continued)

OTHER PUBLICATIONS

Extended European Search Report dated Oct. 8, 2015 in Patent Application No. 12868683.9.

(Continued)

*Primary Examiner* — Yun Qian

(74) *Attorney, Agent, or Firm* — Oblon, McClelland, Maier & Neustadt, L.L.P.

(57) ABSTRACT

Catalytic materials, particularly membranes, exhibiting high activity, high stability and low metal leaching in a variety of chemical reactions, particularly selective hydrogenations of unsaturated organic compounds, are described. These membranes are inorganic/polymeric hybrid materials in which metal complex molecular catalysts are immobilized or metal nano-particle catalysts are embedded. More specifically, the catalytic materials of the present invention exhibit higher activity and selectivity, and can be used in more extensive kinds of organic solvents than the conventional hybrid catalytic materials due to improvement in the affinity to organic solvents by containing the specific polymeric additives.

7 Claims, No Drawings

(56) References Cited

U.S. PATENT DOCUMENTS

2014/0128251 A1    5/2014    Sawa et al.

FOREIGN PATENT DOCUMENTS

| KR | 100526085 B1 | | 11/2005 |
|---|---|---|---|
| WO | 2006/095477 | | 9/2006 |
| WO | 2011/121797 | | 10/2011 |
| WO | WO 2011121797 | * | 10/2011 |
| WO | 2012/176341 | | 12/2012 |

OTHER PUBLICATIONS

Pierluigi Barbaro, et al., "Enantioselective hydrogenation of prochiral substrates in catalytic membrane reactors" Catalysis Science & Technology, vol. 1, No. 2, XP055216551, Jan. 28, 2011, pp. 226-229.

Ozdemir, S. S, et al., "Catalytic polymeric membranes: Preparation and application", Applied Catalysis A: General, vol. 307, pp. 167-183, 2006.

Sawa, H., et al., "Proton Conductive Electrolyte Membranes Based on Tungstic Acid and Poly(vinyl alcohol) Hybrid Compounds", Electrochemistry, vol. 72, No. 2, pp. 111-116, 2004.

International Search Report dated Jun. 5, 2012 in PCT/JP12/054333 Filed Feb. 14, 2012.

Combined Chinese Office Action and Search Report dated Sep. 25, 2015 in Patent Application No. 201280069793.1 (with Partial English translation and English translation of categories of cited documents).

Andrea Schmidt, et al., "Selectivity of partial hydrogenation reactions performed in a pore-through-flow catalytic membrane reactor" Catalysis Today, vol. 104, 2005, pp. 305-312.

Korean Office Action dated Apr. 12, 2017 in corresponding Korean Patent Application No. 10-2014-7017778 w/English translation.

Sangaraju Shanmugam, et al., "A novel single step chemical route for noble metal nanoparticles embedded organic-inorganic composite films", Materials Chemistry and Physics 95 (2006) pp. 51-55.

* cited by examiner

INORGANIC/POLYMERIC HYBRID CATALYTIC MATERIALS WITH HIGH ACTIVITY IN VARIOUS SOLVENTS

FIELD OF THE INVENTION

The present invention relates to new inorganic/polymeric hybrid catalytic materials, particularly membranes, in which metal complex molecular catalysts are immobilized or metal nano-particle catalysts are embedded in the inorganic/polymeric hybrid materials. These catalytic materials exhibit high activity, selectivity, stability, reusability and low metal leaching in a variety of catalytic chemical reactions. More specifically, the present invention relates to the catalytic materials which exhibit higher activity and selectivity, and can be used in more extensive kinds of organic solvents than the conventional hybrid catalytic materials due to improvement in the affinity to organic solvents. The catalytic materials are useful to various kinds of chemical reactions including selective hydrogenations of unsaturated organic substrates.

BACKGROUND OF THE INVENTION

The development of sustainable, i.e. cost-effective and environmentally friendly, highly-selective processes for the production of fine chemicals (pharmaceuticals, agrochemicals, fragrances, etc.) is a current major concern at the industrial level. At present, most industrial processes showing high activity and selectivity, particularly stereo- or enantio-selectivity, are based on the use of homogeneous-phase, molecular catalysts. These compounds commonly consist of heavy (noble) metal complexes containing highly elaborated (chiral) ligands. Besides being complicated to be prepared and expensive, these catalysts suffer from the difficulty of their recovery from the reaction mixture and their reuse. Also, separation of the products from the catalyst and the solution (usually an organic solvent) invariably leads to the emission of volatile pollutants.

In order to solve these problems, the inventors suggested new type of catalytic materials, in which the metal complex molecular catalysts are immobilized in an inorganic/polymeric hybrid material support (PCT/JP2010/056288WO 2011/121797). The inorganic/polymeric hybrid materials are the hybrids of inorganic oxide, such as silicic acid compound and tungstic acid compound, and organic polymers, mainly polyvinyl alcohol (PVA), combining chemically each other. These hybrid materials are produced by simple processes in aqueous solution, in which salts of inorganic oxides are neutralized by acid with PVA co-existing. In this method, the nascent and active inorganic oxides generated by neutralization combine and hybridize with PVA to form the hybrid compounds. The hybrid compounds are distinguished from mixtures of inorganic oxides and PVA, that is, their chemical properties are remarkably changed from their raw materials. For example, once hybridized materials are insoluble in any solvents including hot water. In addition to that, these hybrid materials have extraordinarily high thermal and chemical stability.

The preformed metal complex catalysts able to induce stereo- or enantio-selectivity in hydrogenation reactions of organic substrates, such as [(−)-BINAP)Rh(NBD)]$PF_6$ and [(−)-(Monophos)$_2$Rh(NBD)]$PF_6$, can easily and stably be immobilized not only on the surface but also inside the preformed inorganic/polymeric hybrid materials. The stereo-selectivity of the reaction is almost kept even when the metal complex molecular catalysts are immobilized into the hybrid materials. These catalytic materials, which are heterogeneous catalyst, can easily be recovered from the reaction mixture, and reused. Furthermore, these catalytic materials absorb solvents, especially the high polarity solvents like as methanol, to swell and also absorb reaction substrates, so that chemical reactions proceed not only on the surface but also inside the catalytic materials. It contributes to both the higher activity and the lower metal leaching into solution.

On the other hand, the inorganic/polymeric hybrid materials were applied to another kind of catalytic material by the inventors (PCT/JP2011/065129). In this kind of catalytic material, metal nano-particle (MNP) catalysts are embedded in the inorganic/polymeric hybrid materials.

MNPs, especially those of noble metals, such as platinum, palladium, ruthenium, rhodium and gold, are widely used as effective catalysts in various kinds of chemical processes. In many cases, the MNPs are immobilized onto solid support materials based on porous inorganic materials, such as carbon, silica, titania or alumina. A common strategy to immobilize the MNPs onto a support material is the impregnation method in which the support is immersed into a solution of a metal precursor, dried and calcined. After that, the metal is reduced by some reducing agent to form MNPs.

However, it is difficult to control the particle size by this method, as the size distribution can be wide with particles beyond ten nanometers or more. In addition, the catalytic materials of this type are often used in the form of fine powders, so it is not easy to separate the catalysts from the reaction solution. Very fine powders may also clog or poison the reactors or the autoclaves employed in the chemical reaction. Even when the catalytic materials are not fine powders, the support materials may also pulverize upon agitating. Furthermore, the MNPs on the support materials tend to aggregate upon use to form larger particles having smaller surface area and, hence, lower activity, ultimately resulting in catalyst deactivation after prolonged use. Metal leaching from the catalyst to the reaction solution may also represent a serious problem in terms of contamination of products for the fine chemical (pharmaceutical, perfumery) industry.

Some of the above problems can be solved by using the inorganic/polymeric hybrid materials as support for the MNPs. Due to the absorbency of solvents and reaction substrates, chemical reactions catalyzed by MNPs embedded in the hybrid materials occur both on the surface and inside the hybrid materials, resulting in a high catalytic activity. As the MNPs are embedded in the hybrid materials, aggregation of the MNPs is hampered resulting in a constant catalytic activity upon reuse. Especially, as the MNPs are introduced into the inorganic/polymeric hybrid materials as one of the inorganic constituents, the MNPs can not grow large and stay within nano-size resulting in stably high activity. Embedding the MNPs in the hybrid materials strongly limits their leaching into solution upon use. Although the hybrid materials have the properties of inorganic oxides, they also have flexibility of organic polymers and are not brittle, so the hybrid materials make it possible to avoid pulverization problem.

As mentioned above, the two types of the inorganic/polymeric hybrid catalytic materials, the metal complex molecular catalyst type and the MNP catalyst type, posses some definite advantages comparing to the conventional heterogeneous catalysts. However, they still have some problems, for instance, their catalytic activity strongly depends on the species of solvents. These conventional hybrid catalytic materials are not able to work efficiently until they absorb an enough amount of solvents and reaction substrates. Low solvent uptake causes small swelling and low uptake of reaction substrates, ultimately resulting in low catalytic activity. The inorganic/polymeric hybrid materials prefer the solvents with high polarity, such as water and methanol, because of the hydrophilic property of inorganic oxides. Therefore, the hybrid catalytic materials do not exhibit high activity in the solvents with low polarity. It is expected that higher reaction activity is provided by improvement in affinity to the solvents. Even in the case employing methanol as the solvent, the catalytic activity can be enhanced by increase in the amount of solvent uptake.

In the previous patent application (PCT/JP2011/065129), the inventors disclose that the performance of the hybrid catalytic materials can be tuned by the saponification degree of PVA (polymeric constituent of the inorganic/polymeric hybrid). That is, a low saponification degree (high concentration of acetyl groups) enhances the catalytic activity in low-polar solvents. Although it presents a method for expanding the available solvent species, more effective method is required.

SUMMARY OF THE INVENTION

The present inventions relates to the inorganic/polymeric hybrid catalytic materials, especially catalytic membranes, for chemical reactions. The term "catalytic material (membrane)" is used hereinafter to denote an inorganic/polymeric hybrid catalytic material (membrane) in which metal complex molecular catalysts are immobilized or metal particle catalysts are embedded. The "hybrid material (membrane)" denotes an inorganic/polymeric hybrid material (membrane) for immobilizing the metal complex molecular catalysts or embedding the metal particle catalysts in it, in which inorganic oxides, such as silicic acid compounds, tungstic acid compounds and zirconic acid compounds, are hybridized with PVA or its derivatives in a molecular scale. The term "metal complex molecular catalyst" is any catalytically active metal complex molecule comprising at least one transition metal atom or ion from group IB, IIB, IIIB, IVB, VB, VIB, VIIB, VIII of the Periodic Table of Elements to which one or more ligands are attached. The ligands, both chiral and achiral, can be species able to coordinate transition metal atom or ions, and include phosphines, amines, imines, ethers, carbonyl, alkenes, halides and their mixture thereof. On the other hand, "metal particle catalyst" embedded the inorganic/polymeric hybrid material (membrane) consists of aggregates of metal atoms in the zero-valent state whose dimensions are generally below 1 μm.

One aspect of the present invention relates to the specific polymeric additives in the catalytic materials for improving affinity to solvents, especially to solvents with low polarity, in order to enhance the catalytic activity by uptake of a large amount of solvents and reaction substrates. For this purpose, the specific polymeric additives are preferably more hydrophobic than PVA. More specifically, the specific polymeric additives have at least a unit of —$CH_2$—$CH_2$—O— and a branch structure therein, or a unit of —$Si(CH_3)_2$—O— with carboxyl groups added to part of silicon atoms. One typical example of the specific polymeric additives having a unit of —$CH_2$—$CH_2$—O— and a branch structure therein is polyoxyethylene/polyglyceryl ether. The term "polymeric additive" is used for the specific polymeric additives hereinafter.

Another aspect of the present invention relates to the application of the aforementioned catalytic materials to chemical processes, for example hydrogenations, dehydrogenations, hydrogenolysis, hydroformylations, carbonylations, oxidations, dihydroxylations, epoxidations, aminations, phosphinations, carboxylations, silylations, isomerizations, allylic alkylations, cyclopropanations, alkylations, allylations, arylations, methatesis and other C—C bond forming reactions. The applications of such catalytic materials are particularly useful, but not limited to, the selective hydrogenation reactions.

DETAILED DESCRIPTION OF THE INVENTION

The present invention allows describes the preparation of catalytic materials, especially membranes, with featured by high activity, that can be used in catalytic processes in conjunction with various species of solvents including the solvents with low polarity. The catalytic materials of the invention consist of the inorganic/polymeric hybrid materials in which the metal complex molecular catalysts are immobilized or the metal particle catalysts are embedded, and the hybrid materials contain the polymeric additive which is more hydrophobic than PVA.

The hybrid material is the hybrid of inorganic oxides and PVA or its derivatives. Furthermore, the inorganic oxide is preferably silicic acid compounds, tungstic acid compounds and zirconic acid compounds. Silicic acid means the compound contains $SiO_2$ as its basic compositional unit as well as containing water molecules, and can be denoted by $SiO_2.xH_2O$. In the present invention, silicic acid compound means silicic acid and its derivatives, or any compounds containing silicic acid as a main component. Tungstic acid means the compound containing $WO_3$ as its basic compositional unit as well as containing water molecules, and can be denoted by $WO_3.xH_2O$. In the present invention, tungstic acid compound means tungstic acid and its derivatives, or any compounds containing tungstic acid as a main component. Zirconic acid means the compound containing $ZrO_2$ as its compositional unit as well as containing water molecules, and can be denoted by $ZrO_2.xH_2O$. In the present invention, zirconic acid compound means zirconic acid and its derivatives, or any compounds containing zirconic acid as a main component.

Silicic acid compounds, tungstic acid compounds and zirconic acid are allowed to contain other elements as substituents, to have non-stoichiometric composition and/or to have some additives, as far as the original properties of silicic acid, tungstic acid and zirconic acid can be maintained. Some additives, such as phosphoric acid, sulfonic acid, boric acid, titanic acid, alumina and their derivatives are also available.

For the hybrid materials, perfect pure PVA is not necessarily required, and its derivatives with some modifications, such as partial substitution of some other groups for hydroxyl groups or partial block copolymerization are allowed.

The hybrid materials contain the polymeric additives more hydrophilic than PVA in order to improve affinity to solvents, especially to low polarity solvents. For example, if the polymeric constituent of the hybrid material is only PVA, the solvents with high polarity, such as water and methanol, easily penetrate into the hybrid materials, but most of the common organic solvents, such as ethanol, iso-propanol, acetone, dimethoxyethane and toluene, hardly penetrate, resulting in low catalytic activity. The addition of the polymeric additives with lower polarity into the hybrid materials increases the uptake of the solvents with low polarity to enhance the catalytic activity. Even in the case of the methanol solvent, a large amount of the solvent uptake leads to the higher catalytic activity. The polymeric additives, more specifically, have at least a unit of —CH$_2$—CH$_2$—O— and a branch structure therein, or a unit of —Si(CH$_3$)$_2$—O— with carboxyl groups added to part of silicon atoms. One typical example of the specific polymeric additives having a unit of —CH$_2$—CH$_2$—O— and a branch structure therein is polyoxyethylene/polyglyceryl ether. Even if hydrophobicity of the unit of —CH$_2$—CH$_2$—O— or —Si(CH$_3$)$_2$—O— prevents associating the polymeric additives with the hybrid materials, the branch structure or the carboxyl groups has an effect on fixing the polymeric additives stably to the hybrid materials.

The hybrid materials can be made by a simple aqueous process, in which the salts of inorganic oxides, such as silicate and tungstate are neutralized by acid in the aqueous solution containing PVA or its derivatives and the polymeric additives. In this process, silicate and tungstatate change to the silicic acid compounds and the tungstic acid compounds, respectively, by neutralization. These newborn and nascent compounds are so active that they have a tendency to combine each other. However, in this method, PVA or its derivatives co-exists close to the inorganic compounds, so the newborn and nascent compounds combine to the hydroxyl groups of PVA or its derivatives by dehydration combination. In this method, the polymeric additives are automatically introduced into the hybrid materials only by adding them into the raw solution before neutralization.

The membranes can be made by the common casting method using the above-mentioned precursor solution after the co-existent neutralization process. The fibers of this hybrid compound can be made, for example by the spun-bond method, the melt-blow method or the electro-spinning method. Some porous matrix sheets, such as cloth, non-woven cloth or paper can be used in order to reinforce the hybrid membranes. Any materials, such as polyester, polypropylene, polyethylene, polystyrene and nylon can be employed for the matrix for reinforcement as far as showing enough endurance.

The hybrid materials show high affinity to water or the other solvents having high polarity, and swell by absorbing these solvents. The swelling degree of the membrane can be adjusted by the aldehyde treatment (*Electrochemistry*, 72, 111-116 (2004), JP 4041422, U.S. Pat. No. 7,396,616), if needed. The aldehyde treatment means that the free hydroxyl groups of PVA or its derivatives remaining in the hybrid materials are combined with aldehydes, such as glutaraldehyde, phthalaldehyde, glyoxal and butyraldehyde by contacting the membrane with a solution or a gas reactant including the aldehyde. By the aldehyde treatment, the polymer component is cross-linked or becoming nonpolar (hydrophobic) to adjust the swelling degree. Although the aldehyde treatment can provide some degree of hydrophobicity to the hybrid materials, it is not enough to improve the catalytic activity in the solvents with low polarity, because aldehyde has to be introduced into the preformed hybrid materials, that is, a large amount of aldehyde or aldehyde polymers, which are effective to provide hydrophbicity, can not be introduced.

According to the present invention, the metal complex molecular catalyst contains at least one transition metal atom or ion from group IB, IIB, IIIB, IVB, VB, VIB, VIIB, VIII of the Periodic Table of Elements, to which one or more ligands are attached, can be anchored into the catalytic material. Suitable transition metal atoms or ions include Sc, Ti, V, Cr, Mn, Co, Ni, Cu, Zn, Zr, Mo, Ru, Rh, Pd, Ag, W, Re, Os, Ir, Pt, Au. Ligands can be any organic or metal-organic specie containing one or more donor atoms having a free electronic pair, for instance among phosphorus, nitrogen, oxygen, sulfur, halogen atoms, or mixed-donor atoms set, as well as carbonyls, carboxyls, alkyls, alkenes, dienes, alkynes or any other moieties which are able to coordinate the metal atoms or ions. Mixture of the above mentioned ligands are also contemplated herein. Suitable achiral ligands include, but are not limited to: phosphines, amines, imines, ethers, cyclopentadiene (Cp), cyclooctadiene (COD), norbornadiene (NBD), methanol, acetonitrile, dimethylsulfoxide. Suitable chiral ligands include, but are not limited to: (R,R) or (S,S)-BINAP [2,2'-bis(diphenylphosphino)-1,1'.binaphtalene], (R,R) or (S,S)-DIOP [2,3-O-isopropylidene-2,3-dihydroxy-1,4-bis(diphenylphosphino)butane], (R) or (S)-Monophos [(3,5-dioxa-4-phospha-cyclohepta[2,1-a;3,4-a]dinaphtalen-4-yl)dimethylamine], (R,R) or (S,S)-TMBTP [4,4'-bis(diphenylphosphino)-2,2',5,5'-tetramethyl-3,3'-bithiophene]. Examples of metal complexes contemplated by the present invention include, but are not limited to: [(−)-(TMBTP)Rh(NBD)]PF$_6$, [(−)-BINAP)Rh(NBD)]PF$_6$, [(−)-DIOP)Rh(NBD)]PF$_6$, [(−)-Monophos)$_2$Rh(NBD)]PF$_6$.

The catalytic material of the metal complex molecular catalyst type is obtained by the immobilization of the metal complex molecular catalyst in the preformed hybrid material. The immobilization can be made by a straightforward procedure, that is, by immersing the preformed hybrid materials in a solution of the desired metal complex with stirring. The interactions responsible for the immobilization of the preformed metal complex catalyst in the hybrid material may be based on a combination of non-covalent electrostatic bonds, van der Waals forces, donor-acceptor interactions or other adsorption phenomena which, irrespective of their exact nature, are strong enough to result in an effective anchoring of the metal complex in the hybrid material. The catalytic material thus obtained performs as a heterogeneous catalyst which shows selectivities comparable to those observed in the homogeneous phase, but with the great advantage of being insoluble in the reaction solvent and, hence, easily removed from the reaction mixture by simple decantation and reused. Metal leaching in solution is extremely low in each catalyst reuse. This metal complex catalyst type catalytic material is useful particularly in highly (enantio) selective reactions for which applications in the pharmaceutical, agrochemical or fragrance industry are envisaged.

The catalytic material of the metal complex type are prepared by stirring a solution of a metal complex in an appropriate solvent and in the presence of a preformed hybrid material at a temperature from −40° C. to 150° C. and for a period from 0.5 to 48 hours. Stirring is accomplished either with a fixed membrane and a stirred solution or with a rotating membrane dipped in the above mentioned metal complex solution. Suitable solvents include, but are not limited to: alcohols (preferably methanol), glycols, water, ethers, ketones, esters, aliphatic and aromatic hydrocarbons, alkyl halides. Concentration of the metal complex solution ranges from $1·10^{-4}$ M to $1·10^{-2}$ M, while typical amount of the hybrid material ranges from 20 g to 200 g per 1 g metal in the metal complex, typical areas of the hybrid membrane ranges from 0.5 to 20 cm$^2$. The catalytic material is washed repeatedly with the solvent used for the immobilization, before being dried under a stream of nitrogen. All the above manipulations required for the preparation of the catalytic materials must be carried out under an inert atmosphere depending whether the metal complex is air-sensitive or not. The catalytic materials thus obtained can be stored under nitrogen and is ready-to-use for the subsequent reactions.

For the purpose of evaluate the metal loading in the catalytic materials, the material are dried under high vacuum overnight and analyzed to give a typical metal content of ca. 0.1% to 20% by weight.

The catalytic membranes can be prepared and used by a one-pot technique as follows. The hybrid membrane is introduced in the reactor and the above-mentioned manipulation for immobilizing the metal complex is made in the reactor. The reaction solution can be easily recovered at any time by decantation and the catalytic membrane recycled by simple addition of a fresh solution containing the substrate and the reactants.

According to the present invention, the catalytic materials prepared as above can be used to catalyze a variety of chemical reactions which include, but are not limited to: hydrogenations, dehydrogenations, hydrogenolysis, hydroformylations, carbonylations, oxidations, dihydroxylations, epoxidations, aminations, phosphinations, carboxylations, silylations, isomerizations, allylic alkylations, cyclopropanations, alkylations, allylations, arylations, methatesis and other C—C bond forming reactions. These reactions can be carried out either in solution or in a liquid-gas two phase system. Further, the catalytic membranes can be adapted to the engineering of batch reactors, working either in a fixed-bed or in a rotating membrane mode, or continuous flow reactors for those skilled in the art. When used in a batch mode, the catalytic materials are typically introduced in the reactor in the presence of a solution containing the substrate and the reactants. When a gas reactant is to be used, it will be introduced in the reactor at the desired pressure in the range from 0.01 MPa to 8 MPa. Suitable solvents include, but are not limited to: alcohols (preferably methanol), glycols, water, ethers, ketones, esters, aliphatic and aromatic hydrocarbons, alkyl halogenides. Typical substrate concentration are in the range $1 \cdot 10^{-2}$ M to 10 M. Substrate:catalyst ratio, based on the measured metal content in the catalytic membrane, can vary from 10:1 to 100.000:1. Reactions can be performed with stirring in the temperature range from −40° C. to 150° C. Due to the fact that the catalytic materials are insoluble solids and that the catalysts immobilized in them are heterogeneous, the reaction solution can be easily recovered at any time by simple decantation and the catalytic material recycled by simple addition of a fresh solution containing the substrate and the reactants.

On the other hand, in order to embed the metal nano particle catalysts in the hybrid materials, the hybrid materials are immersed into a solution of a metal salt, such nitrate or sulphate, and in order to absorb these salts inside. After impregnation of the metal, the hybrid materials are washed with pure solvent, and the absorbed salts are reduced by an appropriate reductant, such as hydrogen to turn into a metal form.

In the case of the zirconic acid type catalytic materials, the hybrid material is synthesized by neutralizing zirconium salt and/or oxyzirconium salt by alkali in an aqueous solution containing PVA or its derivatives and the polymeric additives. In this process, zirconic salt or oxyzirconic salt changes to the zirconic acid compounds by neutralization to combine the co-existent PVA or its derivatives. The final hybrid materials are formed by removing the solvent (water) from the above-mentioned precursor solution after the co-existent neutralization process.

Another preparation method can be employed to synthesize the zirconic acid type hybrid materials. In this method, zirconium salt and/or oxyzirconium salt are partially hydrolyzed in an aqueous solution containing PVA or its derivatives and the polymeric additives, by heating the solution at appropriate temperature, for example 40-60° C. At this step, the hybridization is not completed and some zirconium salt and/or oxyzirconium salt are still present. A precursor of the hybrid materials is formed by removing solvent from the solution, for example by the casting method. Thus formed solid mixture is then contacted with alkali to neutralize the remained zirconium salt and/or oxyzirconium salt and to complete the hybridization.

The metal complex molecular catalysts can be immobilized also in the zirconic acid type hybrid materials by the same method as the above-mentioned for silicic and tungstic acid types. However, the zirconic acid type hybrid materials are not necessarily suitable to immobilize metal complex, they are more suitable to embed metal particle. In order to synthesize these catalytic materials, a metal salt of the metal particle catalyst is added into the raw solution before neutralization, or into the raw solution before the hydrolysis process. The salts are converted into metal oxides or hydroxides upon neutralization. The size of the embedded metal oxides or hydroxides is very small (nano-size), because the hybrid materials prevent the metal oxides or hydroxides from growing to a large size particle during the synthesis process. After that, the metal oxides or hydroxides are reduced by an appropriate reducing agent, such as hydrogen, sodium borohydride and sodium formate, to turn into a metal form.

The metal particle catalysts obtained by the above-mentioned methods using the zirconium type hybrid materials are embedded into the material (membrane) so that they hardly to remove and leach into solution upon use of the material in catalysis.

Typical content of the metal particle catalyst in the catalytic materials of the present invention is in the range 0.2 to 10% by weight.

The metal particle catalyst is any metal with catalytic activity, preferably at least one from the group of iron, cobalt, nickel, copper, ruthenium, rhodium, palladium, silver, osmium, iridium, platinum and gold, and with diameter size in the range 0.5-500 nm. Among them, ruthenium, rhodium, palladium, silver, platinum and gold are preferred for their higher stability.

According to the present invention, the catalytic materials of the metal particle catalyst type can be used to catalyze a variety of chemical reactions which include, but are not limited to: hydrogenations, dehydrogenations, hydrogenolysis, hydroformylations, carbonylations, oxidations, dihydroxylations, epoxidations, aminations, phosphinations, carboxylations, silylations, isomerizations, allylic alkylations, cyclopropanations, alkylations, allylations, arylations, methatesis and other C—C bond forming reactions. These reactions can be carried out either in solution or in a liquid-gas two phase system. Further, the catalytic membranes can be adapted to the engineering of batch reactors, working either in a fixed-bed or in a rotating membrane mode, or continuous flow reactors for those skilled in the art. When used in a batch mode, the catalytic materials (membranes) are typically introduced in the reactor in the presence of a solution containing the substrate and the reactants. When a gas reactant is to be used, it will be introduced in the reactor at the desired pressure in the range from 0.1 bar to 80 bar. Suitable solvents include, but are not limited to: alcohols (preferably methanol), glycols, water, ethers, ketones, esters, aliphatic and aromatic hydrocarbons, alkyl halogenides. Typical substrate concentration are in the range $1 \cdot 10^{-2}$ M to 10 M. Substrate:catalyst ratio, based on the measured metal content in the catalytic membrane, can vary from 10:1 to 100.000:1. Reactions can be performed with stirring in the temperature range from −40° C. to 150° C. Due to the fact that the catalytic materials (membrane) are insoluble solids and that the catalysts immobilized on and in them are heterogeneous, the reaction solution can be easily recovered at any time by simple decantation and the catalytic material (membrane) recycled by simple addition of a fresh solution containing the substrate and the reactants. Viability of the use of water as solvent is also worthy to be underlined because of its environmental compatibility.

According to one aspect of the present invention, an olefin having the formula

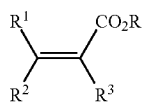

where R is hydrogen, alkyl containing from 1 to about 30 carbon atoms, aryl containing about from 6 to 18 carbon atoms, $R^1$, $R^2$ and $R^3$ are the same or different and containing hydrogen, alkyl containing from 1 to about 30 carbon atoms, alkenyl containing from 1 to about 30 carbon atoms, alkynyl containing from 1 to about 30 carbon atoms, aryl containing about from 6 to 18 carbon atoms, amide, amine, alkoxide containing from 1 to about 30 carbon atoms, ester containing from 1 to about 30 carbon atoms, ketone containing from 1 to about 30 carbon atoms, is hydrogenated by the catalytic membranes of the present invention. The aryl substituents may also be bicyclic, fused species or containing heteroatoms such as sulfur, oxygen, nitrogen, phosphorus. The olefin is introduced in the reactor containing the catalytic membrane as solution in a suitable solvent, preferentially, but not limited to, methanol. The hydrogenation reaction is carried out in the temperature range from −40° C. to 150° C., for a period from 0.5 to 48 hours and under a hydrogen pressure ranging from 0.1 bar to 50 bar. Preferred olefins, but not limited to, are: methyl 2-acetamidoacrylate, 2-acetamidoacrylic acid, dimethylitaconate, itaconic acid, methyl 2-acetamidocinnamate, 2-acetamidocinnamic acid.

According to another aspect of the present invention, an alkyne having the formula

where $R^1$ is hydrogen, alkyl containing from 1 to about 30 carbon atoms, aryl containing about from 6 to 18 carbon atoms, amide, amine, alkoxide containing from 1 to about 30 carbon atoms, ester containing from 1 to about 30 carbon atoms, is hydrogenated by the catalytic membranes of the present invention to give preferentially the corresponding cis-alkene product. The aryl substituents may also be bicyclic, fused species or containing heteroatoms such as sulfur, oxygen, nitrogen, phosphorus. The alkyne is introduced in the reactor containing the catalytic membrane as solution in a suitable solvent, preferentially, but not limited to, methanol. The hydrogenation reaction is carried out in the temperature range from −40° C. to 150° C., for a period from 0.5 to 48 hours and under a hydrogen pressure ranging from 0.1 bar to 50 bar. Preferred alkynes, but not limited to, are 3-hexyn-1-ol.

According to another aspect of the present invention, a diene having the formula

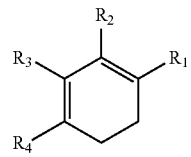

where $R_1$, $R_2$, $R_3$, $R_4$ is hydrogen, alkyl containing from 1 to about 30 carbon atoms, aryl containing about from 6 to 18 carbon atoms, is hydrogenated by the catalytic membranes of the present invention to give preferentially the corresponding cyclic mono-alkene. The diene is introduced in the reactor containing the catalytic membrane as solution in a suitable solvent, preferentially, but not limited to, methanol. The hydrogenation reaction is carried out in the temperature range from −40° C. to 150° C., for a period from 0.5 to 48 hours and under a hydrogen pressure ranging from 0.1 bar to 50 bar. Preferred diene, but not limited to, are 1,5-cyclooctadiene (1,5 COD).

According to another aspect of the present invention, an α,β-unsaturated ketone, having the formula

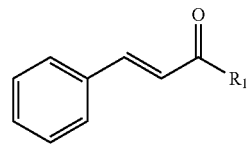

where $R_1$, is hydrogen, alkyl containing from 1 to about 30 carbon atoms, aryl containing about from 6 to 18 carbon atoms, is chemoselectively hydrogenated by the catalytic membranes of the present invention to the corresponding ketone, or aldehyde if $R_1$ is hydrogen. The α,β-unsaturated ketone is introduced in the reactor containing the catalytic membrane as solution in a suitable solvent, preferentially, but not limited to, methanol. The hydrogenation reaction is carried out in the temperature range from −40° C. to 150° C., for a period from 0.5 to 48 hours and under a hydrogen pressure ranging from 0.1 bar to 50 bar. Preferred ketones, but not limited to, are 4-phenyl-buten-2-one.

Both of the catalytic materials of the present invention, the metal complex molecular catalyst type and the metal particle catalyst type, are permeable to solvents and gases. According to this property, chemical reaction catalyzed by the immobilized metal complex or the embedded metal particles may occur both on the surface and inside the hybrid material, resulting in a high catalytic activity. Stable immobilization of the catalytically active metal complex and particle in the hybrid material strongly limits their leaching into solution upon use. Especially for the metal particle type, the hybrid material also hampers aggregation of the catalytic metal particles during catalysis, ultimately resulting in a constant catalytic activity upon reuse.

The catalytic materials of the present invention show better performance, in terms of thermal, mechanical and chemical stability (e.g. resistance towards acids and bases, oxidants, radicals and solvents) compared to conventional organic polymeric support materials. Particularly, due to their cross-linkage to inorganic oxides, the hybrid materials of the present invention show better stability to polar and non-polar solvents and to temperatures above 200° C.

Although the hybrid materials have the properties of inorganic oxides, they also have flexibility of organic polymers and are not brittle. In general chemical reaction of liquid system, the reaction solution is agitated, but the usual support materials, such as carbon or silica, are broken into smaller powders by impact during the agitation. The separation becomes more difficult by pulverization as well as the catalyst activity changes remarkably. The hybrid materials of this invention can make it possible to avoid this problem due to their flexibility.

Furthermore, the catalytic materials of the present invention can be applied to various kinds of solvents including the solvents with low polarity, such ethanol, iso-propanol, butanol, acetone and dimethoxyethane due to the improvement in affinity to solvent by containing the polymeric additives more hydrophilic than PVA in the hybrid materials. Even in the case employing methanol as a solvent, the catalytic materials of the present invention exhibit higher activity than the conventional catalytic materials due to the improvement in the amount of solvent uptake.

The catalytic materials (membranes) can be adapted for use either in a fixed-bed (with stirred reaction solution) or in a rotating membrane assembly reactor. In both cases, the catalytic materials can be easily and straightforwardly reused by removing the reaction solution of the previous reaction cycle, for example by simple decantation, and adding a new batch of solution containing the substrate, under the proper gas atmosphere. The heterogeneous nature of the catalytic materials, ensured by the absence of any catalytic activity of the reaction solution and by the negligible metal loss, allows for minimization of any impurity leached in the reaction solvent containing the desired product and, hence, in its recover without the need of any further purification step.

In conclusion, the present invention describes the preparation and the use of catalytic materials based on inorganic/polymeric hybrid materials containing metal complex or metal particle, which catalyzes a variety of chemical reaction, and particularly highly selective reaction, in mild reaction conditions and with low metal leaching. Furthermore, the catalytic materials can exhibit higher activity than the conventional catalytic materials and can be applied to various kinds of solvents including the solvents with low polarity due to containing the polymeric additives more hydrophilic than PVA in the hybrid materials.

The following examples are given to illustrate the scope of the present invention. Incidentally, the invention embodiment is not limited to the examples given here in after.

Example I

This example illustrates a typical procedure for the preparation of the inorganic/polymeric hybrid material (membrane) especially employed for immobilizing the metal complex molecular catalysts, in accordance with the method of the present invention described above. A raw aqueous solution was obtained by mixing a predetermined amount of sodium silicate, sodium tungstate dihydrate ($Na_2WO_4 \cdot 2H_2O$) and carboxyl-modified silicone (X-22-3701E, Shin-Etsu Chemical Co., Ltd) into a 100 ml of 10 weight % PVA solution. The PVA has average polymerization degree of 3100-3900 and saponification degree of 86-90% (PVA-1). A hydrochloric acid solution of the concentration of 2.4 M was dropped into the raw aqueous solution with stirring for the co-existent neutralization, which induces the hybridization reaction.

This precursor solution was cast on the heat plate covered with polyester film of the coating equipment in condition of heating the plate to a temperature of 60-80° C. The coating equipment is R K Print Coat Instruments Ltd. K control coater having a doctor blade for adjusting a gap with a micrometer and polyester film set on a coating plate. Just after the precursor solution was cast on the plate, the precursor solution was swept by the doctor blade whose gap was adjusted to 0.5 mm at a constant speed in order to smooth the precursor solution in a predetermined thickness. After fluidity of the precursor solution almost disappeared by water vaporization, another precursor solution was cast on it again, swept by the doctor blade, and then the plate was heated at about 115° C., for 1.5 hour. After that, the inorganic/polymeric hybrid membrane thus formed was stripped off from the plate to be washed by hot water and dried. The aldehyde treatment was made by immersing the inorganic/polymeric hybrid membrane into the hydrochloric acid solution of 1.2M concentration containing terephthalaldehyde for an hour at a room temperature.

The composition of catalytic membranes is described in Table 1.

For comparison, the membrane without carboxyl-modified silicone was made from the raw solution without it.

For the as-prepared hybrid membrane, the solvent uptake was tested by immersing the membrane piece, 30 mm×30 mm, in the solvent listed in Table 2 for 24 h, and the solvent uptake was estimated by change in size, shape and softness of the membrane piece. Table 2 reports the test results. These hybrid membranes for solvent uptake test do not have the metal complex catalysts, however the solvent uptake is considered to be similar to that having the metal complex catalysts.

Although this example presents the process for making the membranes, the hybrid material can be formed into any shape and size from the precursor solution. Some additives such as polystyrenesulfonic acid can be added as a component of the hybrid materials by mixing them into the precursor solution. In the case of the reinforcement by the matrix sheet, polyester non-woven cloth is sandwiched between the first cast and the second cast of the precursor solution.

Example II

This example illustrates another typical procedure for the preparation of the inorganic/polymeric hybrid material (membrane) especially employed for the catalytic material of the metal particle embedded type, in accordance with the method of the present invention described above. A raw aqueous solution was obtained by mixing a predetermined amount of oxizirconium chloride and polyoxyethylene/polyglyceryl ether (SC-E2000, Sakamoto Yakuhin Kogyo Co., Ltd) with a 100 ml of 10 weight % PVA solution. The PVA has saponification degree of 78.5-80.5% and is characterized by the viscosity of 44-52 mPa·s (aqueous solution of 4%, 20° C.) (PVA-2). The raw solution is heated at about 40° C. for 1 hour.

This precursor solution was cast on the plate covered with polyester film of the same coating equipment as EXAMPLE I in condition of heating the plate to a temperature of 60-80° C. Just after the precursor solution was cast on the plate, the precursor solution was swept by the doctor blade whose gap was adjusted to 0.5 mm at a constant speed in order to smooth the precursor solution in a predetermined thickness. After fluidity of the precursor solution almost disappears by water vaporization, another precursor solution was cast on it again, swept by the doctor blade, and then the plate was heated at 125° C., for 1.5 hour. After that, this solid mixture membrane was stripped off from the plate and immersed in a 1.7 wt % aqueous solution of ammonia for 24 h. During this immersion process, oxyzirconium chloride turns into zirconium oxide (zirconic acid) to hybridizing with the polymeric constituent. Thus prepared hybrid membrane was washed with hot water and dried.

For comparison, the membrane without polyoxyethylene/polyglyceryl ether was made from the raw solution without it.

For the as-prepared hybrid membrane, the solvent uptake was tested by the same method as EXAMPLE I. Table 2 reports the test results. These hybrid membranes for solvent uptake test do not have the metal particle catalysts, however the solvent uptake is considered to be similar to that having the metal particle catalysts.

Example III

This example illustrates another typical procedure for the preparation of the inorganic/polymeric hybrid material (membrane) especially employed for the catalytic material of the metal particle embedded type, and same as EXAMPLE II except only for using the different kind of polymeric additive. A raw aqueous solution was obtained by mixing a predetermined amount of oxizirconium chloride and carboxyl-modified silicone (X-22-3701E, Shin-Etsu Chemical Co., Ltd) with a 100 ml of 10 weight % PVA (PVA-1) solution. The raw solution is heated at about 40° C. for 1 hour. The procedure after that is the same as EXAMPLE II.

For the as-prepared hybrid membrane, the solvent uptake was tested by the same method as EXAMPLE I. Table 2 reports the test results.

Example IV

This example illustrates a typical procedure for the preparation of the catalytic material (membrane), in accordance with the method of the present invention described above. A raw aqueous solution was obtained by mixing a predetermined amount of oxizirconium chloride, palladium chloride and polyoxyethylene/polyglyceryl ether (SC-E2000, Sakamoto Yakuhin Kogyo Co., Ltd) with a 100 ml of 10 weight % PVA (PVA-2) solution. The raw solution is heated at about 40° C. for 1 hour. The procedure after that is the same as EXAMPLE II, and the catalytic membrane of the metal particle type (NKZPD-12) was obtained.

Another precursor was also prepared. A raw aqueous solution was obtained by mixing a predetermined amount of oxizirconium chloride, palladium chloride and carboxyl-modified silicone (X-22-3701E, Shin-Etsu Chemical Co., Ltd) with a 100 ml of 10 weight % PVA (PVA-1) solution. The raw solution is heated at about 40° C. for 1 hour. The procedure after that is the same as EXAMPLE II, and the catalytic membrane of the metal particle type (NKZPD-14) was obtained.

For comparison, the membrane without polyoxyethylene/polyglyceryl ether or carboxyl-modified silicone was made from the raw solution without it (NKZPD-11).

1 cm$^2$ of the precursor of the catalytic membrane was clamped between two Teflon-windows and introduced into a round bottom flask equipped with a lateral stopcock containing nitrogen-degassed water (15 mL). The suspension was cooled at 0° C. and, under a stream of nitrogen, a large excess of NaBH$_4$ was added in portions in order to reduce Pd(II) to Pd (0). The solution was stirred with an orbital-stirrer, under a nitrogen flow, for 24 h at room temperature. After that time, the water solution was removed by decantation under a stream of nitrogen, the membrane was carefully washed with consecutive additions of degassed water portions (3×20 mL) and methanol portions (3×20 mL) and dried under a stream of nitrogen. The catalytic membrane assembly thus obtained can be stored under hydrogen and it is ready-to-use in an autoclave for subsequent catalytic hydrogenation reactions. For the purpose of evaluating the metal loading in the catalytic membranes, they were removed from the Teflon-holder, dried under vacuum overnight and analyzed by ICP-OES (Inductively Coupled Plasma Optical Emission Spectroscopy) to give the Pd content.

Example V

This example illustrates the procedure used for the hydrogenation reaction of 3-hexyn-1-ol using the hybrid PVA-ZrO2 membranes containing Pd nano-particles (NKZPD-11).

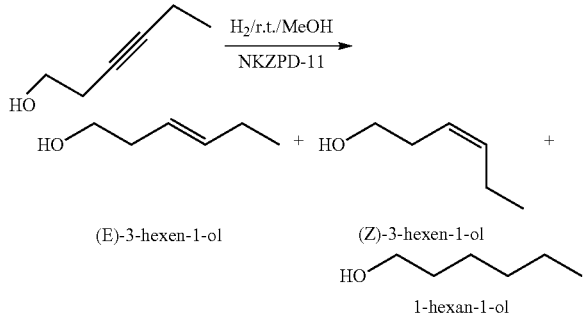

A hydrogen degassed solution of the substrate of 3-hexyn-1-ol (0.0529 mL, 0.484 mmol) in methanol (25 mL, conc. 0.019M) was transferred via a Teflon capillary under a stream of hydrogen, into the autoclave containing the catalytic membrane assembly. The autoclave was degassed with 3 cycles vacuum/hydrogen, then charged with the desired hydrogen pressure and the solution stirred at room temperature for different times. After that time, the autoclave was depressurized under a nitrogen flow and the reaction solution was removed from a bottom drain valve. A sample of this solution (0.5 µL) was analyzed by gas chromatography for the determination of conversion and selectivity to hexen-1-ol and stereoselectivity (Z/E) using a 30 m×0.25 mm ID VF-Wax ms capillary column.

Recycling experiments were performed as follows: a hydrogen-degassed methanol solution of the substrate was transferred via a Teflon® capillary under a stream of hydrogen into the autoclave containing the catalytic membrane after use in the previous hydrogenation reaction. The autoclave was charged with the desired hydrogen pressure and the solution was stirred at room temperature for the desired. After that time, the autoclave was depressurized and the reaction solution was removed from the bottom drain valve, under a stream of hydrogen. A sample of this solution (0.5 µL) was analyzed by gas chromatography to determine the conversion and selectivity. The remaining solution aliquot was analyzed for the determination of the amount of metal leached into solution via ICP-OES analysis (<0.03 ppm)

Representative results are reported in Table 3.

Example VI

This example illustrates the procedure used for the hydrogenation reaction of 3-hexyn-1-ol using the hybrid PVA- ZrO2 membranes containing Pd nano-particles and polyoxyethylene/polyglyceryl ether (NKZPD-12).

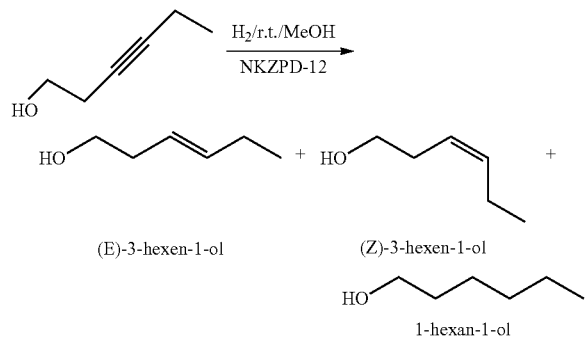

(E)-3-hexen-1-ol   (Z)-3-hexen-1-ol 1-hexan-1-ol

A hydrogen degassed solution of the substrate of 3-hexyn-1-ol (0.0529 mL, 0.484 mmol) in methanol (25 mL, conc. 0.019M) was transferred via a Teflon capillary under a stream of hydrogen, into the autoclave containing the catalytic membrane assembly (2 cm$^2$). The autoclave was degassed with 3 cycles vacuum/hydrogen then charged with 5 bar hydrogen pressure and the solution stirred at room temperature for 2 h. After that time, the autoclave was depressurized under a stream of hydrogen, and the reaction solution was removed from a bottom drain valve. A sample of this solution (0.5 μL) was analyzed by gas chromatography for the determination of conversion and selectivity to hexen-1-ol and stereoselectivity (Z/E) using a 30 m×0.25 mm ID VF-Wax ms capillary column. The remaining solution aliquot was analyzed by ICP-OES to measure Pd leaching in solution (<0.006 ppm).

Recycling experiments were performed as follows: a hydrogen-degassed solution of the substrate (0.0529 mL, 0.484 mmol) in methanol (25 mL, 0.019M)) was transferred via a Teflon® capillary under a stream of hydrogen, into the autoclave containing the catalytic membrane after its use in the previous hydrogenation reaction. The autoclave was charged with 5 bar pressure and the solution was stirred with a magnetic-stirrer at room temperature for the desired time. After that time, the autoclave was depressurized under a stream of hydrogen, and the reaction solution was removed from a bottom drain valve. A sample of this solution (0.5 μL) was analyzed by gas chromatography for the determination of conversion and selectivity to hexen-1-ol and stereoselectivity (Z/E) using a 30 m×0.25 mm ID VF-Wax ms capillary column. The remaining solution aliquot was analyzed by ICP-AES to measure Pd leaching in solution. Representative data for 6 recycling experiments are reported in Table 4.

The effect of polyoxyethylene/polyglyceryl ether as the polymeric additive on conversions and selectivities are confirmed.

Example VII

This example illustrates the procedure used for the hydrogenation reaction of 1,5 COD using the hybrid PVA-ZrO2 membranes containing Pd nano-particles and polyoxyethylene/polyglyceryl ether (NKZPD-12).

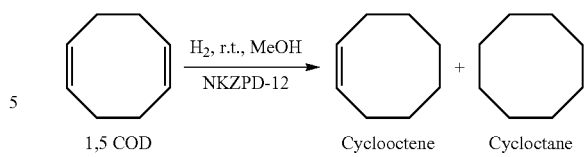

1,5 COD   Cyclooctene   Cyclooctane

A hydrogen degassed solution of the substrate of 1,5 COD (0.030 mL, 0.248 mmol) in methanol (30 mL, conc. 0.0083M) was transferred via a Teflon capillary under a stream of hydrogen, into the autoclave containing the catalytic membrane assembly (2 cm$^2$; 5.52·10$^{-4}$). The autoclave was degassed with 3 cycles vacuum/hydrogen then charged with 5 bar hydrogen pressure and the solution stirred at room temperature for 2 h. After that time, the autoclave was depressurized under a stream of hydrogen, and the reaction solution was removed from a bottom drain valve. A sample of this solution (0.5 μL) was analyzed by gas chromatography for the determination of conversion and selectivity to cycloctene using a 30 m×0.25 mm ID VF-Wax ms capillary column. The remaining solution aliquot was analyzed by ICP-OES to measure Pd leaching in solution (<0.006 ppm).

Recycling experiments were performed as follows: a hydrogen-degassed solution of the substrate (0.030 mL, 0.248 mmol) in methanol (30 mL, 0.0083M)) was transferred via a Teflon® capillary under a stream of hydrogen, into the autoclave containing the catalytic membrane after its use in the previous hydrogenation reaction. The autoclave was charged with 5 bar pressure and the solution was stirred with a magnetic-stirrer at room temperature for the desired time. After that time, the autoclave was depressurized under a stream of hydrogen, and the reaction solution was removed from a bottom drain valve. A sample of this solution (0.5 μL) was analyzed by gas chromatography for the determination of conversion and selectivity to cycloctene using a 30 m×0.25 mm ID VF-Wax ms capillary column. The remaining solution aliquot was analyzed by ICP-OES to measure Pd leaching in solution. Representative data for 6 recycling experiments are reported in Table 5.

Example VIII

This example illustrates the procedure used for the hydrogenation reaction of 4-phenyl-buten-2-one using the hybrid PVA-ZrO2 membranes containing Pd nano-particles and polyoxyethylene/polyglyceryl ether or carboxyl-modified silicone (NKZPD-12 and 14).

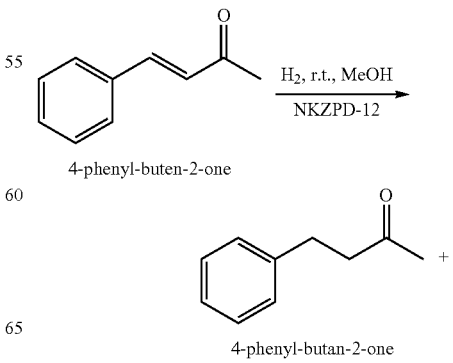

4-phenyl-buten-2-one 4-phenyl-butan-2-one

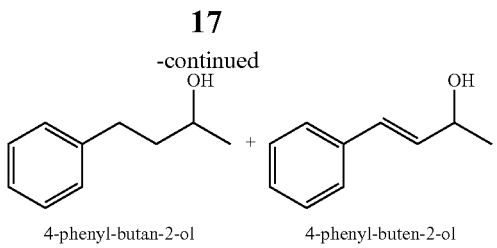

4-phenyl-butan-2-ol     4-phenyl-buten-2-ol

A hydrogen degassed solution of the substrate of 4-phenyl-buten-2-one (36.2 mg, 0.248 mmol) in methanol (25 mL, conc. 0.0099M) was transferred via a Teflon capillary under a stream of hydrogen, into the autoclave containing the catalytic membrane assembly (2 cm$^2$; 5.51·10$^{-4}$). The autoclave was degassed with 3 cycles vacuum/hydrogen then charged with 5 bar hydrogen pressure and the solution stirred at room temperature for 2 h. After that time, the autoclave was depressurized under a stream of hydrogen, and the reaction solution was removed from a bottom drain valve. A sample of this solution (0.5 μL) was analyzed by gas chromatography for the determination of conversion and selectivity to 4-phenyl-butan-2-one using a 30 m×0.25 mm ID VF-Wax ms capillary column. The remaining solution aliquot was analyzed by ICP-OES to measure Pd leaching in solution (<0.07 ppm).

Recycling experiments were performed as follows: a hydrogen-degassed solution of the substrate (36.2 mg, 0.248 mmol) in methanol (25 mL, 0.0099M)) was transferred via a Teflon® capillary under a stream of hydrogen, into the autoclave containing the catalytic membrane after its use in the previous hydrogenation reaction. The autoclave was charged with 5 bar pressure and the solution was stirred with a magnetic-stirrer at room temperature for the desired time. After that time, the autoclave was depressurized under a stream of hydrogen, and the reaction solution was removed from a bottom drain valve. A sample of this solution (0.5 μL) was analyzed by gas chromatography for the determination of conversion and selectivity to 4-phenyl-butan-2-one using a 30 m×0.25 mm ID VF-Wax ms capillary column. The remaining solution aliquot was analyzed by ICP-OES to measure Pd leaching in solution. Representative data for recycling experiments are reported in Table 6 (NKZPD-12) and Table 7 (NKZPD-14).

Example IX

This example illustrates the procedure used for the hydrogenation reaction of methyl-2-acetamideacrylate using the hybrid PVA-ZrO$_2$ membranes containing Pd nano-particles (NKZPD-12).

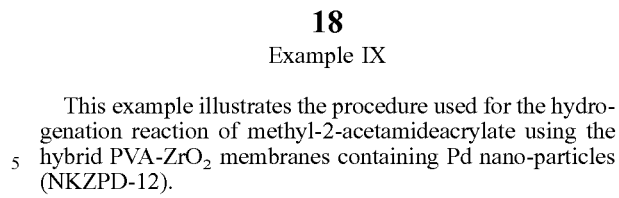

A hydrogen degassed solution of the substrate of methyl-2-acetamideacrylate (17.6 mg, 0.123 mmol) in water (25 mL, conc. 0.0049M) was transferred via a Teflon capillary under a stream of hydrogen, into the autoclave containing the catalytic membrane assembly (2 cm$^2$; 5.51·10$^{-4}$). The autoclave was degassed with 3 cycles vacuum/hydrogen then charged with 10 bar hydrogen pressure and the solution stirred at room temperature for 2 h. After that time, the autoclave was depressurized under a stream of hydrogen, and the reaction solution was removed from a bottom drain valve. A sample of this solution (0.5 μL) was analyzed by gas chromatography for the determination of conversion and selectivity to cycloctene using a 30 m×0.25 mm ID VF-Wax ms capillary column. The remaining solution aliquot was analyzed by ICP-AES to measure Pd leaching in solution (<0.07 ppm).

Recycling experiments were performed as follows: a hydrogen-degassed solution of the substrate (17.6 mg, 0.123 mmol) in methanol (25 mL, 0.0049M)) was transferred via a Teflon® capillary under a stream of hydrogen, into the autoclave containing the catalytic membrane after its use in the previous hydrogenation reaction. The autoclave was charged with 10 bar pressure and the solution was stirred with a magnetic-stirrer at room temperature for the desired time. After that time, the autoclave was depressurized under a stream of hydrogen, and the reaction solution was removed from a bottom drain valve. A sample of this solution (0.5 μL) was analyzed by gas chromatography for the determination of conversion using a 30 m×0.25 mm ID VF-Wax ms capillary column. The remaining solution aliquot was analyzed by ICP-OES to measure Pd leaching in solution. Representative data for 6 recycling experiments are reported in Table 8.

TABLE 1

| | | | | Compositions of catalytic membranes | | | | |
|---|---|---|---|---|---|---|---|---|
| Type | PVA | SiO$_2$$^a$ | WO$_3$$^b$ | ZrO$_2$$^c$ | *CMS$^d$ | *POGE | Pd$^f$ | sd$^g$ |
| EXAMPLE I | | | | | | | | |
| NKSW-1 | PVA-1 | 0.079 | 0.13 | 0 | 0 | 0 | 0 | 86-90% |
| NKSW-2 | PVA-1 | 0.079 | 0.13 | 0 | 0.23 | 0 | 0 | 86-90% |
| EXAMPLE II | | | | | | | | |
| NKZ-1 | PVA-2 | 0 | 0 | 0.093 | 0 | 0 | 0 | 78.5-80.5% |
| NKZ-2 | PVA-2 | 0 | 0 | 0.093 | 0 | 0.19 | 0 | 78.5-80.5% |
| EXAMPLE III | | | | | | | | |
| NKZ-3 | PVA-1 | 0 | 0 | 0.21 | 0 | 0 | 0 | 86-90% |
| NKZ-4 | PVA-1 | 0 | 0 | 0.21 | 0.56 | 0 | 0 | 86-90% |

TABLE 1-continued

Compositions of catalytic membranes

| Type | PVA | $SiO_2$[a] | $WO_3$[b] | $ZrO_2$[c] | *CMS[d] | *POGE[e] | Pd[f] | sd[g] |
|---|---|---|---|---|---|---|---|---|
| EXAMPLE IV | | | | | | | | |
| NKZPD-11 | PVA-2 | 0 | 0 | 0.093 | 0 | 0 | 0.18 | 78.5-80.5% |
| NKZPD-12 | PVA-2 | 0 | 0 | 0.093 | 0 | 0.19 | 0.18 | 78.5-80.5% |
| NKZPD-14 | PVA-1 | 0 | 0 | 0.21 | 0.56 | 0 | 0.20 | 86-90% |

[a]Weight ratio of $SiO_2$ to PVA in membranes.
[b]Weight ratio of $WO_3$ to PVA in membranes.
[c]Weight ratio of $ZrO_2$ to PVA in membranes.
[d]Weight ratio of CMS(carboxyl-modified silicone) to PVA in membranes.
[e]Weight ratio of POGE(polyoxyethylene/polyglyceryl ether) to PVA in membranes.
[f]Weight ratio of Pd to PVA in membranes.
[g]Saponification degree.
*Specific polymeric additive in accordance with the present invention.

TABLE 2

Solvent uptake test

| Type | Water | MeOH[a] | EtOH[b] | IPA[c] | BtOH[d] | ACT[e] | DME[f] | TLE[g] |
|---|---|---|---|---|---|---|---|---|
| EXAMPLE I | | | | | | | | |
| NKSW-1 | ○ | ○ | X | X | X | X | X | X |
| NKSW-2 (CMS) | ○ | ○ | ○ | ○ | ○ | ○ | ○ | X |
| EXAMPLE II | | | | | | | | |
| NKZ-1 | ○ | ○ | X | X | X | X | X | X |
| NKZ-2 (POGE) | ○ | ○ | ○ | ○ | X | ○ | ○ | X |
| EXAMPLE III | | | | | | | | |
| NKZ-3 | ○ | ○ | X | X | X | X | X | X |
| NKZ-4 (CMS) | ○ | ○ | ○ | ○ | X | ○ | ○ | X |

○: Change in size, shape, softness etc.
X: none change in size, shape, softness etc.
[a]MeOH: methanol.
[b]EtOH: ethanol.
[c]IPA: iso-propanol.
[d]BtOH: butanol.
[e]ACT: acetone.
[f]DME: dimethoxyetane.
[g]TLE: toluene.
(CMS): Containing carboxyl-modified silicone as the polymeric additive in accordance with the present invention.
(POGE): Containing polyoxyethylene/polyglyceryl ether as the polymeric additive in accordance with the present invention.

TABLE 3

Hydrogenation reaction of 3-hexen-1-ol by Pd(0) immobilized in NKZPD11-type membranes and recycling experiments.[a,b]

| Membrane | Cycle (n°) | Time (h) | Yield % | TOF ($h^{-1}$) | Selectivity 3-hexen-1-ol | E/Z % | Leaching (ppm)[c] |
|---|---|---|---|---|---|---|---|
| NKZPD-11 | 1 | 2 | 47.20 | 187 | 45 | 69(Z) | <0.03 |
| NKZPD-11 | 2 | 2 | 56.20 | 223 | 45.7 | 74(Z) | <0.03 |
| NKZPD-11 | 3 | 2 | 38.00 | 151 | 45 | 75(Z) | <0.03 |
| NKZPD-11 | 4 | 2 | 48.80 | 194 | 52 | 75(Z) | <0.03 |
| NKZPD-11 | 5 | 15 | 99.40 | 53 | 21.6 | 52(Z) | <0.03 |
| NKZPD-11 | 6 | 2 | 84,00 | 169 | 69.7 | 78(Z) | <0.03 |

[a]Pd content 0.96% w/w for ICP-analysis
[b]Reaction condition: Pd precursor PdO, reducing agent $NaBH_4$, P $H_2$ = 5 bar, r.t, MeOH, Sustrate/Pd = 793;
[c]ICP-AES analysis

TABLE 4

Hydrogenation reaction of 3-hexen-1-ol by Pd(0) immobilized in NKZPD12*-type* membranes and recycling experiments.[a,b]

| Membrane | Cycle (n°) | Time (h) | Yield % | TOF ($h^{-1}$) | Selectivity 3-hexen-1-ol | E/Z % | Leaching (ppm)[c] |
|---|---|---|---|---|---|---|---|
| NKZPD-12 | 1 | 2 | 49.50 | 434 | 65.2 | 72(Z) | <0.006 |
| NKZPD-12 | 2 | 2 | 55.30 | 485 | 73.3 | 75(Z) | <0.006 |
| NKZPD-12 | 3 | 2 | 62.39 | 547 | 78.7 | 76(Z) | <0.006 |
| NKZPD-12 | 4 | 2 | 78.90 | 692 | 83.4 | 77(Z) | <0.006 |
| NKZPD-12 | 5 | 16 | 99.30 | 116 | 81.9 | 74(Z) | <0.006 |
| NKZPD-12 | 6 | 2 | 58.18 | 510 | 90.25 | 84(Z) | <0.006 |

[a] Pd content 0.30% w/w for ICP-analysis
[b] Reaction condition: Pd precursor PdO, reducing agent NaBH$_4$, P H$_2$ = 5 bar, r.t, MeOH, substrate concentration 0.019M, Sustrate/Pd = 1754;
[c] ICP-AES analysis;
*containing polyoxyethylene/polyglyceryl ether as polymeric additive

TABLE 5

Hydrogenation reaction of 1,5-COD by Pd(0) immobilized in NKZPD12-type* membranes and recycling experiments.[a,b]

| Membrane | Cycle (n°) | Time (h) | Yield % | TOF ($h^{-1}$) | Selectivity Cyclooctene | Leaching (ppm)[c] |
|---|---|---|---|---|---|---|
| NKZPD-12 | 1 | 2 | 61.5 | 138 | 88.9 | <0.006 |
| NKZPD-12 | 2 | 2 | 44.7 | 101 | 89.2 | <0.006 |
| NKZPD-12 | 3 | 2 | 41.54 | 93 | 90.2 | <0.006 |
| NKZPD-12 | 4 | 2 | 33.00 | 73 | 91.9 | <0.006 |
| NKZPD-12 | 5 | 16 | 96.80 | 27 | 62.5 | <0.006 |
| NKZPD-12 | 6 | 2 | 34.97 | 79 | 90.7 | <0.006 |

[a] Pd content 0.30% w/w for ICP-analysis
[b] Reaction condition: Pd precursor PdO, reducing agent NaBH$_4$, P H$_2$ = 5 bar, r.t., MeOH, substrate concentration 0.0083M, Sustrate/Pd = 450;
[c] ICP-OES analysis;
*containing polyoxyethylene/polyglyceryl ether as polymeric additive

TABLE 6

Hydrogenation reaction of 4-phenyl-buten-2-one by Pd(0) immobilized onto NKZPD12-type* membranes and recycling experiments.[a,b]

| Membrane | Cycle (n°) | Time (h) | Yield % | TOF ($h^{-1}$) | Selectivity 4-Ph-butan-2-one | Leaching (ppm)[c] |
|---|---|---|---|---|---|---|
| NKZPD-12 | 1 | 2 | 54.40 | 122 | 100 | 0.0628 |
| NKZPD-12 | 2 | 2 | 45.22 | 102 | 100 | 0.0574 |
| NKZPD-12 | 3 | 2 | 41.18 | 93 | 100 | 0.0650 |
| NKZPD-12 | 4 | 2 | 31.46 | 71 | 100 | 0.0589 |
| NKZPD-12 | 5 | 16 | 96.41 | 29 | 100 | 0.0478 |
| NKZPD-12 | 6 | 2 | 17.39 | 39 | 100 | 0.0518 |

[a] Pd content 0.30% w/w for ICP-analysis,
[b] Reaction condition: Pd precursor PdO, reducing agent NaBH$_4$, P H$_2$ = 5 bar, r.t., MeOH, substrate concentration 0.0099M, Sustrate/Pd = 450;
[c] ICP-OES analysis;
*containing polyoxyethylene/polyglyceryl ether as polymeric additive

TABLE 7

Hydrogenation reaction of 4-phenyl-buten-2-one by Pd(0) immobilized onto NKZPD14-type* membranes and recycling experiments.[a,b]

| Membrane | Cycle (n°) | Time (h) | Yield % | TOF ($h^{-1}$) | Selectivity 4-Ph-butan-2-one | Leaching (ppm)[c] |
|---|---|---|---|---|---|---|
| NKZPD-14 | 1 | 2 | 49.5 | 111 | 100 | <0.1 |
| NKZPD-14 | 2 | 2 | 45.2 | 102 | 100 | <0.1 |

TABLE 7-continued

Hydrogenation reaction of 4-phenyl-buten-2-one by Pd(0) immobilized onto NKZPD14-type* membranes and recycling experiments.[a,b]

| Membrane | Cycle (n°) | Time (h) | Yield % | TOF ($h^{-1}$) | Selectivity 4-Ph-butan-2-one | Leaching (ppm)[c] |
|---|---|---|---|---|---|---|
| NKZPD-14 | 3 | 2 | 40.8 | 92 | 100 | <0.1 |
| NKZPD-14 | 4 | 2 | 29.8 | 67 | 100 | <0.1 |

[a]Pd content 0.30% w/w for ICP-analysis;
[b]Reaction condition: Pd precursor PdO, reducing agent $NaBH_4$, P $H_2$ = 5 bar, r.t., MeOH, substrate concentration 0.0099M, Sustrate/Pd = 450;
[c]ICP-OES analysis;
*containing carboxyl-modified silicone as polymeric additive

TABLE 8

Hydrogenation reaction of MAA by Pd(0) immobilized onto NKZPD12-type* membranes and recycling experiments.[a,b]

| Membrane | Cycle (n°) | Time (h) | Yield % | TOP ($h^{-1}$) | Leaching (ppm)[c] |
|---|---|---|---|---|---|
| NKZPD-12 | 1 | 2 | 66.26 | 74 | 0.0637 |
| " | 2 | 2 | 55.83 | 62 | 0.0496 |
| " | 3 | 2 | 51.61 | 58 | 0.0478 |
| " | 4 | 2 | 54.05 | 60 | 0.0423 |
| " | 5 | 16 | 97.79 | 14 | 0.0448 |
| " | 6 | 2 | 40.68 | 45 | 0.0449 |

[a]Pd content 0.30% w/w for ICP-analysis;
[b]Reaction condition: Pd precursor PdO, reducing agent $NaBH_4$, P $H_2$ = 10 bar, r.t., $H_2O$, substrate concentration 0.0049M, Sustrate/Pd = 223;
[c]ICP-OES analysis;
*containing polyoxyethylene/polyglyceryl ether as polymeric additive

What is claimed is:

1. A catalytic material, comprising
    a hybrid compound comprising
        a zirconic acid compound,
        polyvinyl alcohol, and
        a polymer comprising
            a unit of —$CH_2$—$CH_2$—O— and a branch structure therein or
            a unit of —$Si(CH_3)_2$—O— in which methyl group at part of the silicon atom is substituted by carboxyl group; and
    a metal particle catalyst of aggregates of metal atoms in zero-valent state,
    wherein
    the metal particle catalyst is embedded in the hybrid compound, and
    an amount of uptake of methanol and ethanol in the hybrid compound is increased by adding the polymer into the hybrid compound.

2. The catalytic material according to claim 1, wherein the polymeric additive is the polymeric additive comprising polymer comprises a unit of —$CH_2$—$CH_2$—O— and a branch structure, which is polyoxyethylene/polyglyceryl ether.

3. The catalytic material according to claim 1, wherein the polymer comprises a unit of —$Si(CH_3)_2$—O— in which methyl group at part of the silicon atom is substituted by carboxyl group.

4. The catalytic material according to claim 1, wherein the metal particle catalyst comprises at least one metal selected from the group consisting of iron, cobalt, nickel, copper, ruthenium, rhodium, palladium, silver, osmium, iridium, platinum and gold.

5. The catalytic material according to claim 1, wherein the metal particle catalyst is palladium particle catalyst.

6. The catalytic material according to claim 1, wherein the catalytic material is a membrane.

7. A method for preparing the catalytic material according to claim 1, the method comprising
    1) synthesizing the hybrid compound by neutralizing a salt of the metal particle catalyst, and at least one of zirconium salt and oxyzirconium salt with alkali in a solution containing polyvinyl alcohol and the polymer, and then removing the solvent,
    2) or immersing a solid mixture of polyvinyl alcohol, the polymer, the salt of the metal particle catalyst, and the at least one of zirconium salt and oxyzirconium salt in an alkali solution or smearing the solid mixture with the alkali solution and neutralizing the mixture, and
    3) reducing thus synthesized hybrid compound to turn oxides, hydroxides, or both the oxides and the hydroxides of the metal particle catalyst into metal particles.

* * * * *